United States Patent
Hancock et al.

(10) Patent No.: US 12,280,784 B2
(45) Date of Patent: *Apr. 22, 2025

(54) BATTERY ELECTRIC VEHICLE (BEV) TORQUE SPLIT CONTROL

(71) Applicant: JAGUAR LAND ROVER LIMITED, Coventry (GB)

(72) Inventors: Matthew Hancock, Coventry (GB); David Copp, Coventry (GB); Lee Adcock, Coventry (GB); Alex Plianos, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/047,618

(22) Filed: Oct. 18, 2022

(65) Prior Publication Data

US 2024/0123994 A1    Apr. 18, 2024

Related U.S. Application Data

(63) Continuation of application No. 16/285,640, filed on Feb. 26, 2019, now Pat. No. 11,472,411.

(30) Foreign Application Priority Data

Feb. 26, 2018   (GB) .................................... 1803046

(51) Int. Cl.
   *B60W 30/18*   (2012.01)
   *B60K 1/00*   (2006.01)
   (Continued)

(52) U.S. Cl.
   CPC ......... *B60W 30/18172* (2013.01); *B60K 1/02* (2013.01); *B60K 6/52* (2013.01);
   (Continued)

(58) Field of Classification Search
   None
   See application file for complete search history.

(56) References Cited

U.S. PATENT DOCUMENTS

| 6,958,587 B1 | 10/2005 | Naik |
| 7,742,852 B1 | 6/2010 | Tang |

(Continued)

FOREIGN PATENT DOCUMENTS

| EP | 2223821 A2 | 9/2010 |
| EP | 3132966 A1 | 2/2017 |

(Continued)

OTHER PUBLICATIONS

Ewin, N., "Traction Control for Electric Vehicles with Independently Driven Wheels," Doctoral Thesis, Balliol College, University of Oxford, Summer 2016, 211 pages.

(Continued)

*Primary Examiner* — Kyle T Johnson
*Assistant Examiner* — Arslan Azhar
(74) *Attorney, Agent, or Firm* — McCoy Russell LLP

(57) ABSTRACT

A controller is provided for a vehicle having front and rear axles, each axle having two wheels, and first and second propulsion units. The controller controls the first and second propulsion units to generate a combined torque with reference to a total requested torque. The controller is configured to: receive a torque request signal; receive traction signals indicating available traction at at least one wheel; determine a traction torque range defined by a maximum and minimum torque for at least one of the at least first or second propulsion units in dependence on one or more of the traction signals; determine a proposed distribution of torque between each of the at least first and second propulsion units with reference to the total requested torque; and determine a proposed torque to be generated by each of the at least first and second propulsion units in dependence on the proposed distribution of torque.

16 Claims, 8 Drawing Sheets

(51) Int. Cl.
  *B60K 1/02* (2006.01)
  *B60K 6/52* (2007.10)
  *B60K 17/356* (2006.01)
  *B60L 15/20* (2006.01)
  *B60W 10/08* (2006.01)
  *B60W 30/02* (2012.01)
  *B60W 30/188* (2012.01)
  *B60W 50/00* (2006.01)

(52) U.S. Cl.
  CPC ............ *B60K 17/356* (2013.01); *B60L 15/20* (2013.01); *B60L 15/2045* (2013.01); *B60W 10/08* (2013.01); *B60W 30/02* (2013.01); *B60K 2001/001* (2013.01); *B60L 2240/36* (2013.01); *B60L 2240/421* (2013.01); *B60L 2240/423* (2013.01); *B60L 2240/425* (2013.01); *B60W 30/1882* (2013.01); *B60W 2050/0013* (2013.01); *B60W 2050/0026* (2013.01); *B60W 2050/0027* (2013.01); *B60W 50/0098* (2013.01); *B60W 2510/081* (2013.01); *B60W 2510/083* (2013.01); *B60W 2510/087* (2013.01); *B60W 2520/10* (2013.01); *B60W 2520/26* (2013.01); *B60W 2540/10* (2013.01); *B60W 2540/12* (2013.01); *B60W 2552/40* (2020.02); *B60W 2710/083* (2013.01); *B60W 2720/403* (2013.01)

(56) References Cited

U.S. PATENT DOCUMENTS

| | | |
|---|---|---|
| 9,409,577 B2 | 8/2016 | Kim |
| 9,463,697 B1 | 10/2016 | Gauthier |
| 10,124,698 B2 | 11/2018 | Martin |
| 2002/0049120 A1 | 4/2002 | Lindstrom et al. |
| 2004/0176899 A1 | 9/2004 | Hallowell |
| 2005/0274560 A1 | 12/2005 | Wakao et al. |
| 2006/0025905 A1 | 2/2006 | Zhao et al. |
| 2007/0027606 A1 | 2/2007 | Fodor et al. |
| 2008/0183353 A1 | 7/2008 | Post et al. |
| 2008/0264709 A1 | 10/2008 | Fenker et al. |
| 2009/0107747 A1 | 4/2009 | Luehrsen et al. |
| 2009/0157246 A1 | 6/2009 | Mori et al. |
| 2010/0222953 A1 | 9/2010 | Tang |
| 2012/0083385 A1 | 4/2012 | Smith et al. |
| 2013/0035818 A1 | 2/2013 | Meitinger et al. |
| 2014/0257613 A1 | 9/2014 | Tang |
| 2015/0057866 A1 | 2/2015 | Tseng et al. |
| 2016/0169374 A1 | 6/2016 | Kanada et al. |
| 2018/0056811 A1 | 3/2018 | Wahana |
| 2018/0372200 A1 | 12/2018 | Kumar et al. |
| 2019/0193577 A1 | 6/2019 | Kaneko et al. |
| 2019/0337398 A1 | 11/2019 | Fujiwara et al. |

FOREIGN PATENT DOCUMENTS

| | | |
|---|---|---|
| GB | 2544764 A | 5/2017 |
| KR | 101535036 B1 | 7/2015 |
| WO | 2013057930 A1 | 4/2013 |
| WO | 2015131180 A1 | 9/2015 |

OTHER PUBLICATIONS

Great Britain Intellectual Property Office, Combined Search and Examination Report under Sections 17 and 183) Issued in Application No. GB1803046.0, Aug. 29, 2018, 10 pages.

ISA European Patent Office, International Search Report and Written Opinion Issued in Application No. PCT/EP2019/051000, Apr. 26, 2019, WIPO, 12 pages.

Great Britain Intellectual Property Office, Examination Report under Section 18(3) Issued in Application No. GB1803046.0, May 27, 2020, 5 pages.

BATTERY ELECTRIC VEHICLE (BEV) TORQUE SPLIT CONTROL

CROSS-REFERENCE TO RELATED APPLICATION

The present application is a continuation of U.S. Non-Provisional patent application Ser. No. 16/285,640, entitled "BATTERY ELECTRIC VEHICLE (BEV) TORQUE SPLIT CONTROL," and filed on Feb. 26, 2019. U.S. Non-Provisional patent application Ser. No. 16/285,640 claims priority to Great Britain Application No. 1803046.0 filed on Feb. 26, 2018. The entire contents of each of the above-listed applications are hereby incorporated by reference for all purposes.

TECHNICAL FIELD

The present disclosure relates to a battery electric vehicle (BEV) torque split control. In particular, but not exclusively it relates to a BEV torque split control in a vehicle for controlling the torque split between propulsion units. Aspects of the invention relate to a controller for controlling at least first and second propulsion units, to a vehicle comprising a controller, to methods of controlling at least first and second propulsion units, and to a non-transitory computer-readable medium.

BACKGROUND

It is known to provide a battery electric vehicle (BEV) with at least one propulsion unit per axle for transmitting torque to at least one wheel per axle. By way of example, the vehicle may comprise a first propulsion unit for transmitting torque to a front axle; and a second propulsion unit for transmitting torque to a rear axle. This configuration offers various advantages in terms of performance, stability/traction, increased regenerative capacity during braking and overall efficiency. Determination of the torque distribution between the two axles is a non-trivial task that has to consider often conflicting attributes and constraints.

It is an aim of the present invention to provide efficient control of a vehicle drivetrain whilst meeting required vehicle dynamics attributes.

SUMMARY OF THE INVENTION

Aspects and embodiments of the invention provide a controller for a vehicle, a system for controlling a vehicle, a vehicle, a method of controlling a vehicle, a computer program, and a non-transitory computer readable medium as claimed in the appended claims.

According to an aspect of the invention there is provided a controller for a vehicle with a front and rear axle each axle being provided with at least two wheels and at least first and second propulsion units, the controller for controlling the at least first and second propulsion units to generate a combined torque with reference to a total requested torque, the controller comprising:
  means to receive a torque request signal;
  means to receive one or more traction signals indicating at least one vehicle operating condition;
  means to determine a traction torque range defined by a maximum and minimum torque for at least one of the at least first or second propulsion units in dependence on one or more of the traction signals;
  means to determine a proposed distribution of torque between each of the at least first and second propulsion units with reference to the total requested torque;
  means to determine a proposed torque to be generated by each of the at least first and second propulsion units in dependence on the proposed distribution of torque;
  means to compare the traction torque range determined for each propulsion unit for which a traction torque range has been determined and the proposed torque for that propulsion unit;
  means to generate at least one torque control signal for controlling at least one of the at least first and second propulsion units; wherein
  the torque control signal is a signal to the propulsion unit to generate the proposed torque for that propulsion unit if the proposed torque for that propulsion unit is within the traction torque range for that propulsion unit.

The at least one vehicle operating condition may be one or more of vehicle speed, wheel speeds, longitudinal acceleration, lateral acceleration, estimated coefficient of friction (p) of the surface over which the vehicle is traveling, or other conditions that have an effect on the traction available to a moving vehicle.

This provides the advantage that the controller can
  determine a maximum and minimum torque that can be applied to each axle or wheel without loss of traction with reference to the signals received by the controller that are indicative of at least one vehicle operating condition,
  determine, on the basis that there will be no loss of traction by any of the wheels, a proposed distribution of the torque requested by a driver or other controller of the vehicle to meet one or more predetermined vehicle level attributes,
  determine proposed torques to be applied by each propulsion unit,
  compare the proposed torque for at least one propulsion unit with the maximum and minimum torques determined for that propulsion unit,
  and generate at least one control signal for at least one propulsion unit, at least one control signal being such that the at least one propulsion unit applies the proposed torque for that control unit to the axle with which the control unit is associated if the comparison between the proposed torque for at least one propulsion unit and the maximum and minimum torques determined for that propulsion unit shows that the proposed torque is equal to or between the maximum and minimum torques.

If the comparison between the proposed torque for at least one propulsion unit and the maximum and minimum torques determined for that propulsion unit shows that the proposed torque is greater than the maximum torque or less than the minimum torque, then the controller may generate at least one control signal for at least one propulsion unit, the at least one control signal being such that the at least one propulsion unit applies a torque with a predetermined relationship to the proposed torque for that propulsion unit to the axle with which the propulsion unit is associated. The predetermined relationship may be such that the total torque applied by the propulsion units is between the maximum and minimum torques determined for that propulsion unit. The predetermined relationship may be such that the total torque may be less than the torque requested by a driver or other controller of the vehicle. This is useful and improves safety of the vehicle if the requested torque may be predicted to result in loss of traction by one or more wheels.

The maximum and minimum torques are determined according to one or more predetermined criteria. One of those criteria may be to ensure that none of the wheels lose traction on the surface over which the vehicle is or will be moving. As such, the maximum and minimum torques may be determined with reference to at least one vehicle operating condition. For example, such conditions include but are not limited to the nature surface over which the vehicle is or will be moving, including the coefficient of friction of the surface, and or the nature of the surface (eg solid or loose); one or more factors relating to the vehicle such as but not limited to the speed of the vehicle, the mass of the vehicle, and or the cornering of the vehicle; and or one or more factors relating to the environment proximal to the vehicle such as but not limited to the temperature of the surface over which the vehicle is moving, the air temperature, and or the quantity of water or other liquids on the surface.

The one or more predetermined vehicle level attributes which will determine the proposed distribution of the torque requested by a driver or other controller of the vehicle may include but not be limited to the efficiency of the operation of the propulsion units.

According to another aspect of the invention there is provided a controller in which the torque control signal is a signal to the propulsion unit to generate a torque within the traction torque range for that propulsion unit if the proposed torque for that propulsion unit is not within the traction torque range for that propulsion unit.

This provides the advantage that the torque applied to the axle with which the propulsion unit is associated is not expected to result in a loss of traction for the wheels on that axle. This increases the safety of the vehicle because it is unlikely to become out of control because of a loss of traction.

According to another aspect of the invention there is provided a controller in which the torque control signal is a signal to the propulsion unit to generate a torque with a value approximately equal to whichever end of the traction torque range for that propulsion unit is closest to the proposed torque if the proposed torque for that propulsion unit is not within the traction torque range for that propulsion unit.

This provides the advantage that the torque applied to the axle with which the propulsion unit is associated is both such that it is as close as possible to the preferred torque if loss of traction were not expected, and such that the torque is not expected to result in a loss of traction for the wheels on that axle. This increases the safety of the vehicle because it is unlikely to become out of control because of a loss of traction whilst applying a torque distribution that is as close to the proposed torque distribution as possible.

According to another aspect of the invention there is provided a controller in which if the proposed torque for a propulsion unit is not within the traction torque range for that propulsion unit, the means to determine a proposed distribution of torque between each of the at least first and second propulsion units will re-determine the distribution of torque between each of the at least first and second propulsion units in dependence on at least the traction torque range for at least one of the propulsion units.

This provides the advantage that the controller will determine a proposed distribution of torque between each of the at least first and second propulsion units with reference to the maximum and minimum torques permitted for each propulsion unit. This may lead to an improved quality of ride or handling of the vehicle relative to known vehicles whilst increasing the safety of the vehicle because it is unlikely to become out of control because of a lack of traction.

According to another aspect of the invention there is provided a controller in which the controller comprises means to receive at least one vehicle dynamics signal relating to one or more of the handling of the vehicle, the steering feel of the vehicle and or the environment around the vehicle and the traction torque range for at least one of the at least first or second propulsion units is determined in dependence on at least one of the traction signals and at least one of the vehicle dynamics signals.

This provides the advantage that the traction torque range can be determined to both seek to avoid loss of traction and to respond to one or more aspect of the vehicle dynamics. This leads to a safer and more comfortable ride for passengers in a vehicle including a controller of the invention than in known vehicles.

According to another aspect of the invention there is provided a controller in which the controller comprises means to receive at least one NVH signal relating to one or more of the noise vibration and or harshness characteristics of the vehicle and the traction torque range for at least one of the at least first or second propulsion units is determined in dependence on at least one of the traction signals and at least one of the NVH signals.

This provides the advantage that the traction torque range can be determined to both seek to avoid loss of traction and to respond to one or more aspect of the noise, vibration and or harshness characteristics of the vehicle. This leads to a safer and more comfortable ride for passengers in a vehicle including a controller of the invention than in known vehicles.

According to another aspect of the invention there is provided a controller in which the at least one of the traction signals has greater influence in the determination of the traction torque range than the at least one of the vehicle dynamics signals. This provides the advantage that the safety of not losing traction has a greater influence on the determination of the traction torque range than the vehicle dynamics which are not as safety critical.

According to another aspect of the invention there is provided a controller in which the at least one of the traction signals has greater influence in the determination of the traction torque range than the at least one of the vehicle dynamics signals when present, the at least one of the traction signals has greater influence in the determination of the traction torque range than the at least one of the NVH signals, and the at least one of the vehicle dynamics signals when present has greater influence in the determination of the traction torque range than the at least one of the NVH signals. This provides the advantage that the safety of not losing traction has a greater influence on the determination of the traction torque range than the vehicle dynamics and or noise vibration and or harshness which are not as safety critical.

According to another aspect of the invention there is provided a controller in which the determination of the traction torque range for at least one of the at least first or second propulsion units is dependent on one or more characteristics of the propulsion unit, the power supply for the propulsion unit, and or the axle with which the propulsion unit is associated. This provides the advantage that the maximum and minimum torques in the traction torque range for the propulsion unit can be limited to torques that are appropriate for the propulsion unit in light of the characteristics of the propulsion unit. This helps avoid damage to the propulsion unit.

According to another aspect of the invention there is provided a controller in which the means to determine a proposed distribution of torque between each of the at least first and second propulsion units with reference to the total requested torque comprises means to determine a total power cost in dependence on an estimated power loss of the at least first and second propulsion units within said at least first and second torque ranges, means to identify a minimum value of the determined total power cost, and means to determine the torque to be generated by each of said at least first and second propulsion units, in which the means to determine the torque to be generated by each of said at least first and second propulsion units determines the torques to correspond to the identified minimum value of the total power cost.

This provides the advantage that the controller determines a total power cost associated with a plurality of torque distributions between the at least first and second propulsion units. The total power cost may provide an indication of the efficiency of a particular torque split between said at least first and second propulsion units. The torque split corresponding to the minimum total power cost is determined and the first and second control signals generated to control the first and second propulsion units. Thus, at least in certain embodiments, the efficient operation of at least first and second propulsion units may be maintained.

The power loss for the at least first and second propulsion units may be estimated for one or more different torque distributions within said at least first and second torque ranges. In certain embodiments, the power loss may be estimated for a plurality of different torque distributions.

According to another aspect of the invention there is provided a controller in which the controller is configured to determine at least first and second power loss penalties in dependence on current operating parameters of the at least first and second propulsion units. This provides the advantage that the controller seeks to minimise the power costs when determining the proposed torques for the propulsion units thus maximizing efficiency and the environmental benefits that arise therefrom.

According to another aspect of the invention there is provided a controller in which the at least first and second propulsion units each comprise an eclectic machine, the controller being configured to determine the at least first and second power loss penalties in dependence on an operating temperature of the associated electric machine. This provides the advantage that the controller optimises the torque distribution to minimise inefficiency in the operation of the propulsion units.

According to another aspect of the invention there is provided a controller in which the controller is configured to determine when the operating temperature of each electric machine increases above one or more predetermined temperature thresholds.

According to another aspect of the invention there is provided a controller in which the total power cost is determined in dependence on the estimated power loss and the power loss penalties of each of said at least first and second propulsion units.

According to another aspect of the invention there is provided a controller in which the power loss of each of the at least first and second propulsion units is estimated in dependence on one or more of the following set: an operating temperature; an operating speed; and a motor torque.

According to another aspect of the invention there is provided a controller in which the controller is configured to estimate the power loss of each of the at least first and second propulsion units at a plurality of intervals within the determined first and second torque ranges.

According to another aspect of the invention there is provided a controller in which the torque comprises an output torque and/or a regenerative torque.

According to another aspect of the invention the controller as previously described may comprise two or more controllers in communication with each other.

According to another aspect of the invention there is provided a system comprising a controller as previously described for a vehicle with a front and rear axle, each axle being provided with at least two wheels, and at least first and second propulsion units the controller being adapted to control the at least first and second propulsion units to generate a combined torque with reference to a total requested torque.

According to another aspect of the invention there is provided a vehicle comprising a controller as previously described.

According to another aspect of the invention there is provided a method for controlling at least first and second propulsion units of a vehicle with a front and rear axle each axle being provided with at least two wheels, the at least first and second control units being suitable to generate a combined torque with reference to a total requested torque, the method comprising:

receiving a torque request signal;
receiving at least one traction signal indicating at least one vehicle operating condition;
determining a traction torque range defined by a maximum and minimum torque for at least one of the at least first or second propulsion units in dependence on at least one of the traction signals;
determining a proposed distribution of torque between each of the at least first and second propulsion units with reference to the total requested torque;
determining a proposed torque to be generated by each of the at least first and second propulsion units in dependence on the proposed distribution of torque;
comparing the traction torque range determined for each propulsion unit for which a traction torque range has been determined and the proposed torque for that propulsion unit;
generating at least one torque control signal for controlling at least one of the at least first and second propulsion units; wherein
the torque control signal is a signal to the propulsion unit to generate the proposed torque for that propulsion unit if the proposed torque for that propulsion unit is within the traction torque range for that propulsion unit.

The at least one vehicle operating condition may be one or more of vehicle speed, wheel speeds, longitudinal acceleration, lateral acceleration, estimated coefficient of friction (p) of the surface over which the vehicle is traveling, or other conditions that have an effect on the traction available to a moving vehicle.

This provides the advantages previously described in connection with the controller of the present invention. The operation of the method of this aspect of the invention may occur in a single controller or be distributed between at least two controllers.

According to another aspect of the invention there is provided a method in which the torque control signal is a signal to the propulsion unit to generate a torque within the traction torque range for that propulsion unit if the proposed torque for that propulsion unit is not within the traction torque range for that propulsion unit.

According to another aspect of the invention there is provided a method in which the torque control signal is a signal to the propulsion unit to generate a torque with a value approximately equal to whichever of the maximum or minimum torques for that propulsion unit is closest to the proposed torque if the proposed torque for that propulsion unit is not within the traction torque range for that propulsion unit.

According to another aspect of the invention there is provided a method in which if the proposed torque for a propulsion unit is not within the traction torque range for that propulsion unit, the means to determine a proposed efficient distribution of torque between each of the at least first and second propulsion units will re-determine the distribution of torque between each of the at least first and second propulsion units in dependence on the traction torque range for at least one of the propulsion units.

According to another aspect of the invention there is provided a method in which the method comprises:
receiving at least one vehicle dynamics signal relating to one or more of the handling of the vehicle, the steering feel of the vehicle and or the environment around the vehicle; and
the traction torque range for at least one of the at least first or second propulsion units is determined in dependence on at least one of the traction signals and at least one of the vehicle dynamics signals.

According to another aspect of the invention there is provided a method in which the method comprises:
means to receive at least one NVH signal relating to one or more of the noise vibration and or harshness characteristics of the vehicle; and
the traction torque range for at least one of the at least first or second propulsion units is determined in dependence on at least one of the traction signals and at least one of the NVH signals.

According to another aspect of the invention there is provided a method in which the at least one of the traction signals has greater influence in the determination of the traction torque range than the at least one of the vehicle dynamics signals.

According to another aspect of the invention there is provided a method in which the at least one of the traction signals has greater influence in the determination of the traction torque range than the at least one of the vehicle dynamics signals when present, the at least one of the traction signals has greater influence in the determination of the traction torque range than the at least one of the NVH signals, and the at least one of the vehicle dynamics signals when present has greater influence in the determination of the traction torque range than the at least one of the NVH signals.

According to another aspect of the invention there is provided a method in which the determination of the traction torque range for at least one of the at least first or second propulsion units is dependent on one or more characteristics of the propulsion unit, the power supply for the propulsion unit, and or the axle with which the propulsion unit is associated.

According to another aspect of the invention there is provided a computer program that, when run on at least one electronic processor causes a system to perform the previously described methods.

According to another aspect of the invention there is provided a non-transitory computer readable medium comprising the previously described computer program.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
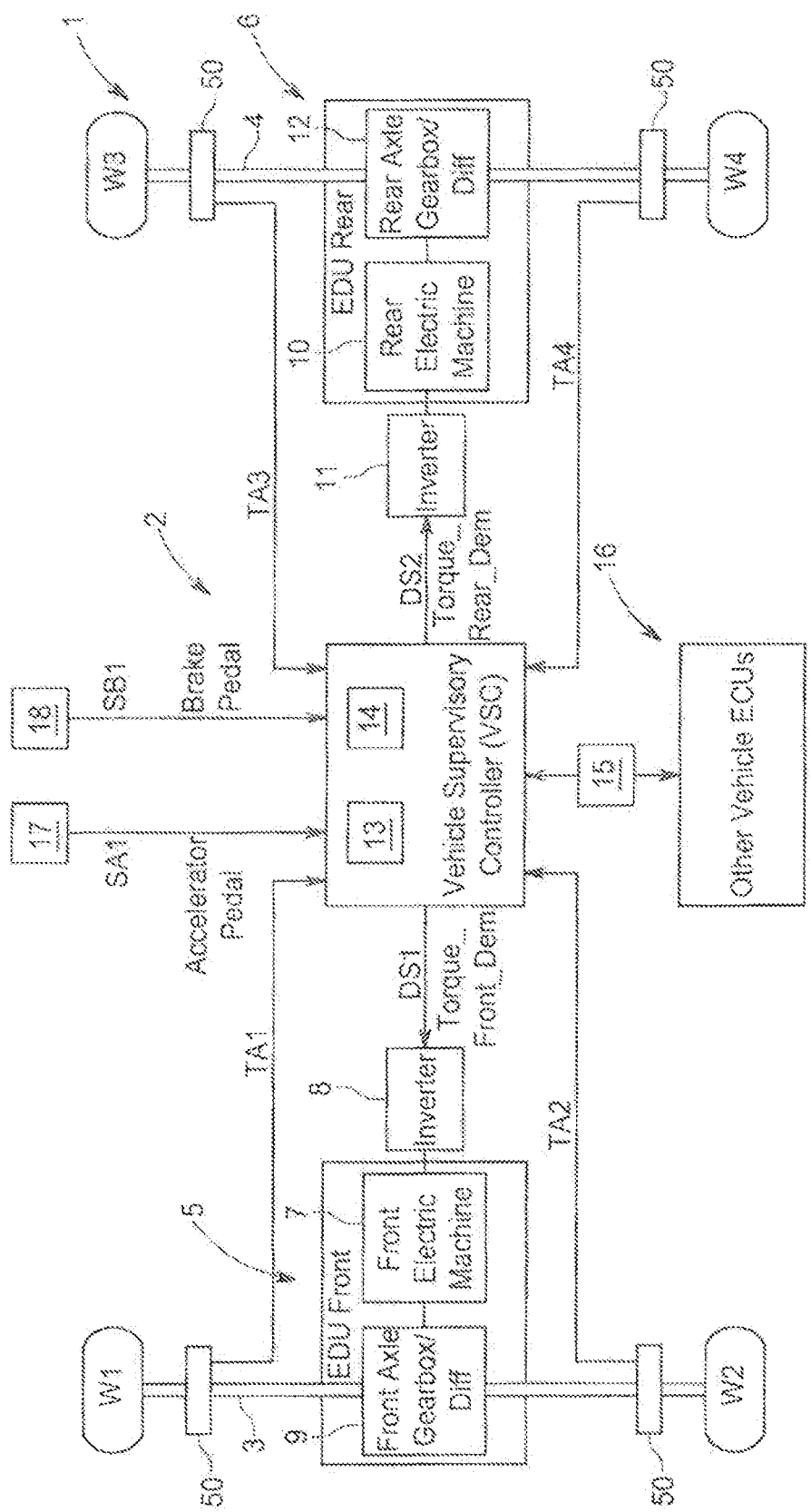
FIG. 1 shows a schematic representation of a vehicle incorporating a controller for controlling a torque split between first and second propulsion units and the levels of torque applied by each propulsion unit in accordance with an aspect of the present invention.

A vehicle 1 incorporating a controller 2 in accordance with an aspect of the present invention will now be described with reference to the accompanying Figures. The vehicle 1 in the present embodiment is a battery electric vehicle, but the techniques and apparatus described herein are applicable in other types of vehicle, such as a hybrid electric vehicle (HEV) or plug-in hybrid electric vehicle (PHEV). As shown in FIG. 1, the vehicle 1 in the present embodiment has four wheels W1-4 mounted on front and rear axles 3, 4. The vehicle 1 in the present embodiment is a four-wheel drive vehicle and, in use, torque is selectively transmitted to each of the wheels W1-4 to propel the vehicle 1. The vehicle 1 may, for example, be an automobile, a utility vehicle or a sports utility vehicle.

The vehicle 1 comprises a first propulsion unit 5 for transmitting a first torque T1 to the front axle 3; and a second propulsion unit 6 for transmitting a second torque T2 to the rear axle 4. In the present embodiment, the first propulsion unit 5 is operable to transmit a front torque to the front wheels W1, W2 of the vehicle 1; and the second propulsion unit 6 is operable to transmit a rear torque to the rear wheels W3, W4 of the vehicle 1. The term "front torque" used herein refers to the torque applied at the front axle 3; and the term "rear torque" used herein refers to the torque applied at the rear axle 4. The first and second propulsion units 5, 6 are operative to generate complementary front and rear torques TQ1, TQ2. The aggregate of the front and rear torques TQ1, TQ2 is generally at least substantially equal to a total requested torque TQ. The front and rear torques TQ1, TQ2 may be expressed as a percentage of the total requested torque TO. The front and rear torques TQ1, TQ2 are complementary and, when combined, are generally at least substantially equal to the total requested torque TQ (i.e. 100%). The total requested torque TQ may be generated in dependence on a driver torque request.

The first propulsion unit 5 comprises a first electric machine 7, a first inverter 8 and a first gearbox/differential 9. The second propulsion unit 6 comprises a second electric machine 10, a second inverter 11 and a second gearbox/differential 12. The first and second electric machines 7, 10 are traction motors for generating torque to propel the vehicle 1. The first and second electric machines 7, 10 each comprise a rotor and a stator (not shown). The first and second inverters 8, 11 are connected to a traction battery (not shown) for supplying power to the first and second electric machines 7, 10. The first and second inverters 8, 11 also perform DC to AC conversion for AC motors. The controller 2 is configured to output front and rear torque demand signals DS1, DS2 to control operation of the first and second propulsion units 5, 6. The front and rear torque demand signals DS1, DS2 control operation of the first and second electric machines 7, 10. The controller 2 may thereby control the first and second torques T1, T2 transmitted to the front and rear axles 3, 4.

The controller 2 comprises an electronic processor 13 coupled to a memory device 14. The memory device 14 comprises a set of non-transitory instructions which, when executed, cause the electronic processor 13 to perform the method(s) described herein. The controller 2 is connected to an interface 15, such as a communication bus, to communicate with electronic control units (ECUs) provided in the vehicle 1. The ECUs are denoted generally by the reference numeral 16 in FIG. 1. The controller 2 is configured to receive an accelerator signal SA1 from an accelerator pedal sensor 17 associated with an accelerator pedal (not shown) provided in the vehicle 1. The controller 2 is configured also to receive a brake signal SB1 from a brake pedal sensor 18 associated with a brake pedal (not shown) provided in the vehicle 1. The controller 2 is configured also to receive traction signals TA1-4 from traction sensors 50 associated with each of the wheels W1-4.

Figure 2:
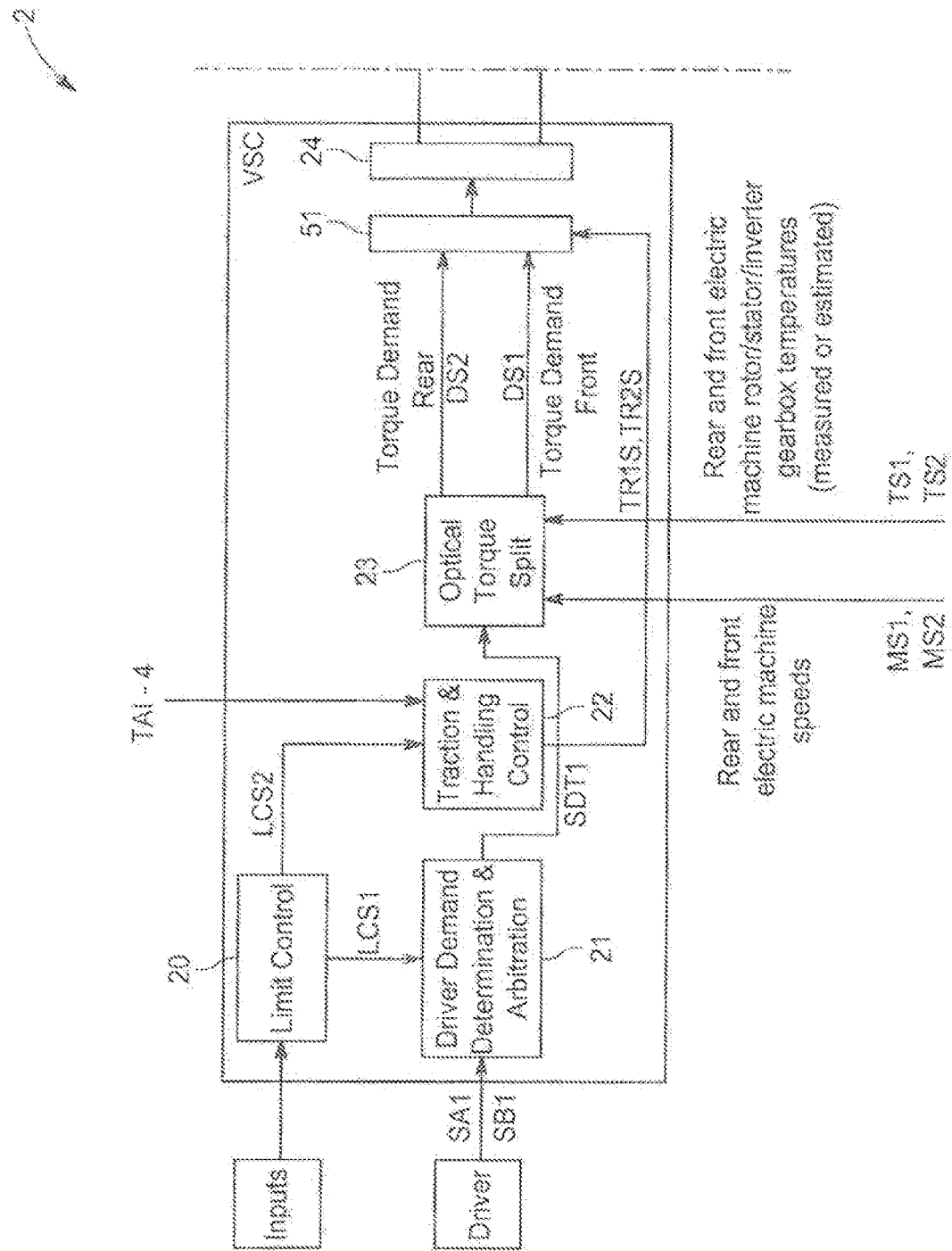
FIG. 2 shows a block diagram illustrating the relationship between the controller and the first and second electric machines shown in FIG. 1.
Figure 2:
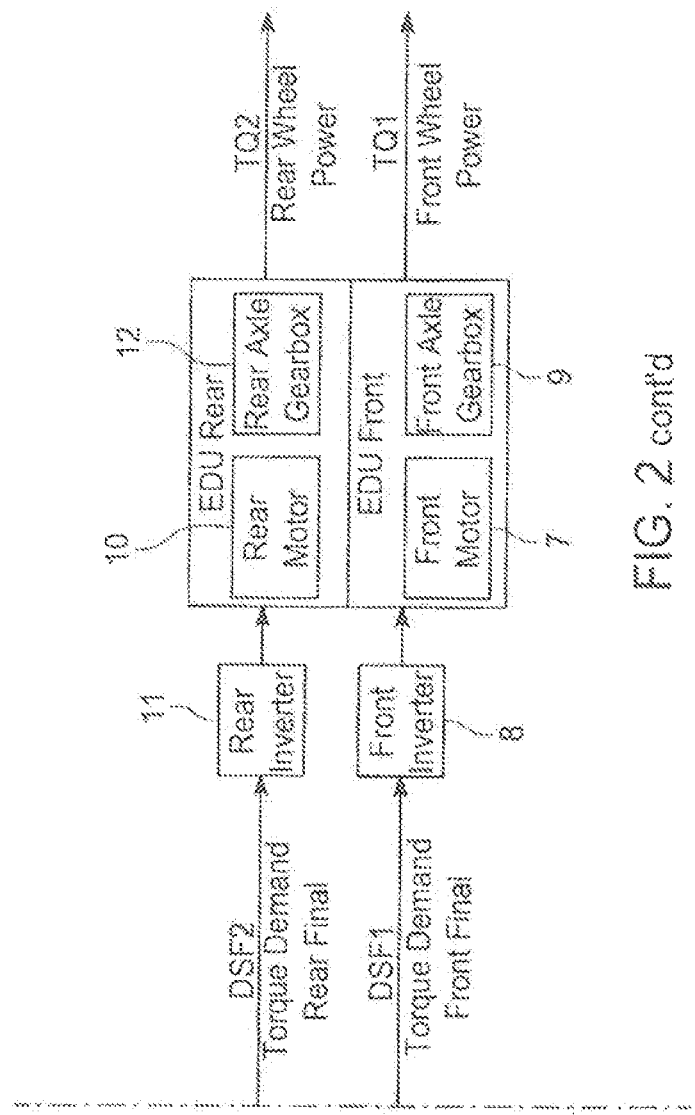

A schematic representation of the controller 2 is shown in FIG. 2. The controller 2 is configured to implement a limit control module 20, a driver demand determination and arbitration module 21, a traction and handling control module 22, a torque split module 23, traction determination module 51, and a torque shaping module 24.

The limit control module 20 receives maximum and minimum limits from controllers (not shown) associated with the first and second inverters 8, 11. In some applications, the limit control module 20 may receive a pair of inverter limits for each of the first and second electric machines 7, 10 to describe peak capability (i.e. motor/inverter capability for a short duration of time) and continuous capability (i.e. motor/inverter capability for indefinite operation). The limit control module 20 also receives a power limit from the traction battery and converts this to an equivalent torque limit for each of the first and second electric machines 7, 10, for example by partitioning the power limit according to a current torque split between said first and second electric machines 7, 10. The limit control module 20 may generate a maximum and minimum limit for each of the first and second electric machines 7, 10 in dependence on one or more of these limits. The limit control module 20 generates first and second limit control signals LCS1, LCS2. The first limit control signal LCS1 represents the combined powertrain maximum and minimum operational limits. The second limit control signal LCS2 comprises maximum and minimum limits for each of the first and second electric machines 7, 10 at the wheel frame of reference, i.e. actuator limits converted to wheel frame of reference by accounting for the transmission ratio and losses.

The first and second limit control signals LCS1, LCS2 are output to the driver demand determination and arbitration module 21 and the traction and handling control module 22 respectively. The driver demand determination and arbitration module 21 receives driver inputs, including the accelerator signal SA1 and the brake signal SB1. The driver demand determination and arbitration module 21 is operative to generate a torque demand signal SDT1 in dependence on the accelerator signal SA1 and the brake signal SB1. The torque demand signal SDT1 comprises a total requested torque TQ to be transmitted to the front and rear axles 3, 4 as a traction torque or a regenerative torque. The total requested torque may be a positive (accelerating) torque (+ve) for transmitting a drive torque to the wheels W1-4; or a negative (braking) torque (−ve) for transmitting a braking or regenerative torque to the wheels W1-4. It will be understood that the vehicle 1 may decelerate if the positive (+ve) torque request is less than the overall vehicle losses, which may occur, for example, when the vehicle 1 is ascending a gradient. Conversely, the vehicle 1 may accelerate if the negative (−ve) torque request is less than the overall vehicle gains, which may occur, for example, when the vehicle 1 is descending a gradient. The total requested torque TQ may be generated in dependence on a cruise control system or an adaptive cruise control system. The controller 2 may be operated in conjunction with an autonomous or semi-autonomous control module(s) which may at least generate the total requested torque TQ. The torque demand signal SDT1 is output to the torque split module 23. The torque split module 23 is operative to control proposed torques transmitted to the front and rear axles 3, 4 to meet the total requested torque TQ.

The traction and handling control module 22 is configured to determine first and second traction torque ranges TR1, TR2 indicated by signals TR1S, TR2S which define respective first and second ranges of the torque to be transmitted to the front and rear axles 3, 4 respectively. The first and second traction torque ranges TR1, TR2 may be at least partially determined in dependence on detected operating conditions or driving modes. The driving modes can be selected by a driver of a vehicle according to the invention.

The traction and handling control module 22 is configured to determine traction torque ranges TR1, TR2 in dependence on traction signals TA1-4 received from sensors or other signal generating means 50 indicating at least one vehicle operating condition. The at least one vehicle operating condition may be one or more of vehicle speed, wheel speeds, longitudinal acceleration, lateral acceleration, estimated coefficient of friction (p) of the surface over which the vehicle is traveling, or other conditions that have an effect on the traction available to a moving vehicle.

The traction and handling control module 22 may determine the extent of the first and second traction torque ranges TR1, TR2 in dependence on the longitudinal acceleration and/or lateral acceleration of the vehicle 1. Alternatively, or in addition, the traction and handling control module 22 may determine the extent of the first and second traction torque ranges TR1, TR2 in dependence on the rate of change of the longitudinal acceleration and/or lateral acceleration of the vehicle 1. The extent of the first and second traction torque ranges TR1, TR2 may be inversely proportional to the longitudinal acceleration and/or lateral acceleration. Any changes made to the extent of the first and second traction torque ranges TRT1, TR2 dependent on changes to the longitudinal acceleration and/or lateral acceleration of the vehicle 1 may be made progressively. At high longitudinal and lateral accelerations, the extent of the first and second traction torque ranges TR1, TR2 may be reduced. Alternatively or additionally, the traction and handling control module 22 may at least partially determine traction torque ranges in dependence on signals indicative of an estimated coefficient of friction (p) of the surface under the wheels W1-4 of the vehicle 1. The traction and handling control module 22 may change the extent of the proposed first and second torque ranges TR1, TR2 in dependence on changes in the longitudinal acceleration and/or lateral acceleration.

Any changes made to the proposed torque distribution and/or the extent of the first and second torque ranges TRT1, TR2 may be made progressively.

The first and second traction torque ranges TR1, TR2 each define minimum and maximum proposed torque limits for the first and second propulsion units 5, 6. Thus, the proposed first torque range TR1 defines a minimum front torque and a maximum front torque for transmission to the front axle 3; and the proposed second torque range TR2 defines a minimum rear torque and a maximum rear torque for transmission to the rear axle 4. Alternatively, or in addition, the first traction torque range TR1 and/or the second traction torque range TR2 may be capped by a minimum/maximum torque limit, for example dependent on an operating speed SPEED1, SPEED2 of the respective first and second electric machines 7, 10. Alternatively, or in addition, the proposed first torque range TR1 and/or the proposed second torque range TR2 may at least partially be determined in dependence on operating limits, for example one or more of the following set: traction battery power limit, inverter limits and transmission limits. Alternatively, or in addition, the proposed first torque range TR1 and/or the proposed second torque range TR2 may at least partially be determined to maintain dynamic stability of the vehicle.

Figure 7A:
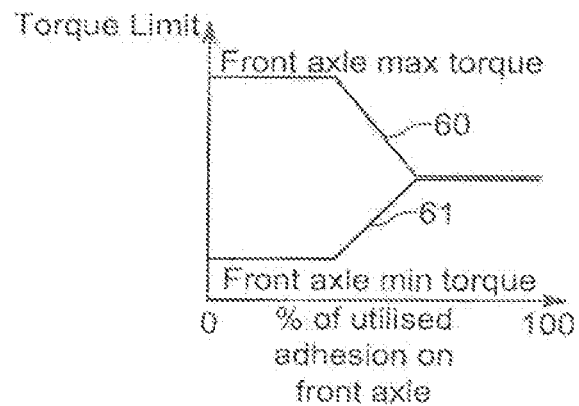
FIG. 7*a* shows a chart representing the maximum and minimum torque limits with reference to the percentage of utilised adhesion for the front axle.

The traction and handling control module 22 received traction signals TA1, TA2 for the front axle and, using one or more predetermined criteria or functions, determines the percentage of available traction (adhesion with the surface over which the wheels are passing) that is being used by the front axle and or the percentage of available traction being used by each of the wheels W1 and W2. The percentage of available traction is determined with reference to the percentage of available traction being used. The percentage of adhesion or traction that is being used by the axle 3 or the wheels W1 and W2 is used to determine the maximum and minimum torques that can be applied to the front axle and or each of the wheels W1 and W2 on the front axle. These maximum and minimum torques define a front traction torque range. The determination of the maximum and minimum torques is based on at least one predetermined criteria or algorithms. An example of such a predetermined criteria or algorithm for the front axle is shown graphically in FIG. 7a in which the maximum torque for any given percentage of utilised torque or adhesion is shown by plot 60. The minimum torque for any given percentage of utilised torque or adhesion is shown by plot 61.

The traction torque range is a range of torques which, if applied to the axle 3 and or the wheels W1 and W2, will not lead to a loss of traction for one or both of wheels W1 and W2. As may be seen from FIG. 7a, when the percentage of the utilised torque or adhesion is low the maximum torque is high and the minimum torque (regenerative torque) is low. As the percentage of the utilised torque or adhesion increases, the permitted maximum torque initially remains constant and then decreases as a function of the increase in the percentage of the utilised torque or adhesion until, as the percentage of the utilised torque or adhesion approaches 100% the maximum permitted torque reaches a predetermined maximum level which is lower than the maximum torques at lower percentages of utilised torque or adhesion. As the percentage of the utilised torque or adhesion increases, the permitted minimum torque initially stays constant and then increases as a function of the increase in the percentage of the utilised torque or adhesion until, as the percentage of the utilised torque or adhesion approaches 100% the minimum permitted torque reaches a predetermined level which is higher than the minimum torques at lower percentages of utilised torque or adhesion.

Figure 7B:
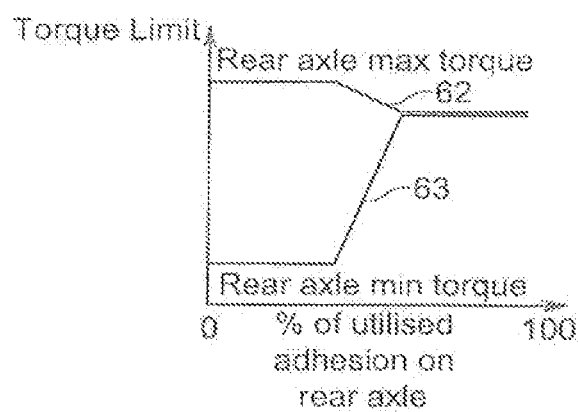
FIG. 7*b* shows a chart representing the maximum and minimum torque limits with reference to the percentage of utilised adhesion for the rear axle.

In a similar fashion, the traction availability module 51 takes the traction signals TA3 and TA4 for the rear axle and, using one or more predetermined criteria or functions determines the percentage of available traction (adhesion with the surface over which the wheels are passing) that is being used by the rear axle and or the percentage of available traction being used by each of the wheels W3 and W4. The determined percentage of available traction is used to determine the percentage of adhesion or traction that is being used by the axle 4 or the wheels W3 and W4 and thus maximum and minimum torques that can be applied to the rear axle and or each of the wheels W3 and W4 on the rear axle. These maximum and minimum torques define a rear traction torque range. The determination of the maximum and minimum torques is based on at least one predetermined criteria or algorithms. An example of such a predetermined or algorithm for the rear axle is shown graphically in FIG. 7b in which the maximum torque for any given percentage of utilised torque or adhesion is shown by plot 62. The minimum torque for any given percentage of utilised torque or adhesion is shown by plot 63.

The traction torque range is a range of torques which, if applied to the axle 4 and or the wheels W3 and W4, will not lead to a loss of traction for one or both of wheels W3 and W4. As may be seen from FIG. 7b, when the percentage of the utilised torque or adhesion is low the maximum torque is high and the minimum torque (regenerative torque) is low. As the percentage of the utilised torque or adhesion increases, the permitted maximum torque initially stays constant and then decreases as a function of the increase in the percentage of the utilised torque or adhesion until, as the percentage of the utilised torque or adhesion approaches 100% the maximum permitted torque reaches a predetermined maximum level which is lower than the maximum torques at lower percentages of utilised torque or adhesion.

As the percentage of the utilised torque or adhesion increases, the permitted minimum torque initially stays constant and then increases as a function of the increase in the percentage of the utilised torque or adhesion until, as the percentage of the utilised torque or adhesion approaches 100% the minimum permitted torque reaches a predetermined level which is higher than the minimum torques at lower percentages of utilised torque or adhesion. It may also be seen from FIGS. 7a and 7b that the criteria for determining the traction torque ranges for the front and rear axles are not the same.

In other embodiments of the invention different criteria and or functions can be used to determine the maximum and minimum torques with reference to percentage of utilised torque or adhesion.

Signals TR1S and TR2S indicative of the first and second traction torque ranges TR1, TR2 are output to the traction availability module 51.

Torque split module 23 is operative to control the proposed torque transmitted to the front and rear axles 3, 4 to meet the total requested torque TQ. The torque split module 23 is operative to optimise the efficiency of the first and second electric machines 7, 10. In certain embodiments, the torque split module 23 may be configured to optimise the overall combined efficiency of the first and second propulsion units 3, 4, for example considering the operating efficiencies of the first and second inverters 8, 11 and/or the first and second gearbox/differentials 9, 12. As described herein, the torque split module 23 is configured to generate the proposed front and rear torque demand signals DS1, DS2 to control operation of the first and second electric machines 7, 10. The proposed front torque demand signal DS1 comprises a front torque request TQ1 for the first electric machine 7; and the proposed rear torque rear torque demand signal DS2 comprises a rear torque request TQ2 for the second electric machine 10. The aggregate of each complementary pair of proposed front and rear torque requests TQ1, TQ2 is at least substantially equal to the total requested torque TQ. The torque split module 23 is configured to receive first and second motor speed signals MS1, MS2. The torque split module 23 is also configured to receive first and second temperature signals TS1, TS2 relating to the respective first and second propulsion units 5, 6. The first temperature signal TS1 comprises one or more of the following set: a temperature of the first electric machine 7 (rotor and/or stator temperature); a temperature of the first inverter 8, and a temperature of the first gearbox/differential 9. The second temperature signal TS2 comprises one or more of the following set: a temperature of the second electric machine 10 (rotor and/or stator temperature); a temperature of the second inverter 11; and a temperature of the second gearbox/differential 12. The first temperature signal TS1 and/or the second temperature signal TS2 may be measured by one or more sensors (not shown) coupled to the respective components. Alternatively, the first temperature signal TS1 and/or the second temperature signal TS2 may be estimated by respective thermal models, for example in dependence on operating conditions or loads of the respective components. The operation of the torque split module 23 to generate the front and rear torque demand signals DS1, DS2 as described in more detail below with reference to FIG. 3. The proposed front and rear torque demand signals DS1, DS2 are output to the traction determination module 51.

The traction determination module 51 receives proposed front and rear torque demand signals DS1, DS2 together with traction torque range signals TA1 and TA2.

The traction availability module 51 is configured to compare the proposed torques for each axle received as signals DS1 and DS2 from the torque split module 23 with the traction torque range signals TR1S and TR2S from the traction and handling control module 22.

If the proposed torque for the front axle indicated by signal DS1 falls within the traction torque range indicated by signal TR1S and the proposed torque for the rear axle indicated by signal DS2 falls within the traction torque range indicated by signal TR2S, the traction determination module 51 will send the front and rear torque demand signals DS1, DS2 to the torque shaping module 24.

In some embodiments, if the proposed torque for the front axle indicated by signal DS1 does not fall within the traction torque range indicated by signal TR1S and or the proposed torque for the rear axle indicated by signal DS2 does not fall within the traction torque range indicated by signal TR2S, the traction determination module 51 will adjust the proposed torques that fall outside of the relevant traction torque range for the appropriate axle so that the proposed torques fall within the traction torque range for that axle. The torque traction availability module 51 will then send the front or rear torque demand signals DS1, DS2 (if unadjusted) or front or rear adjusted torque signals to the torque shaping module 24. The adjustment to the front and or rear torque demand signals DS1, DS2 is made using predetermined criteria.

In some embodiments the predetermined criteria will adjust the signal so that it is indicative of a torque approximately equal to the end of the traction torque range closest to the proposed front and rear torque demand signals DS1 or DS2.

In some embodiments the predetermined criteria comprise causing the torque split module 23 to determine a revised proposed torque and associated signal DS1 and or DS2 in dependence on the traction talk range indicated by signal TR1S or TR2S respectively. That revised proposed torque will fall within the appropriate traction torque range and revised proposed front and rear torque demand signals DS1 or DS2 is sent to traction availability module 51.

In some embodiments of the present invention and in some instances of operation, if the proposed torque for the front axle indicated by signal DS1 does not fall within the traction torque range indicated by signal TR1S and or the proposed torque for the rear axle indicated by signal DS2 does not fall within the traction torque range indicated by signal TR2S, the traction availability module 51 will adjust one or both of the proposed first and second torques to torque values within the torque traction range indicated by signals TR1S and or TR2S and with a total torque less than total requested torque TQ. This is particular benefit if one or more of the wheels W1-4 is close to losing traction, that is the percentage of utilised traction or adhesion is approaching 100%.

The torque shaping module 24 will re-profile the front and rear torque demand signals received from the traction availability module 51 and generate front and rear final torque demand signals DSF1, DSF2 which are output to the respective first and second inverters 8, 11. The first and second inverters 8, 11 control operation of the first and second electric machines 7, 10 in dependence on said front and rear final torque demand signals DSF1, DSF2. As outlined above, the first and second electric machines 7, 10 may generate a positive torque for propelling the vehicle 1 or a negative torque to slow the vehicle 1. The first and second electric machine 7, 10 may be configured to regenerate energy under braking, for example to recharge the traction battery.

The torque split module 23 is configured to determine a total power cost TPC associated with operating the first and second electric machines 7, 10 to generate varying proportions of the total requested torque TQ. The total power cost TPC provides an indication of the overall efficiency of the first and second propulsion units 5, 6. The torque split module 23 identifies when the total power cost TPC is at a minimum and determines the corresponding torque split between the first and second propulsion units 5, 6. The proposed front and rear torque demand signals DS1, DS2 are generated such that the proposed front and rear torque requests TQ1, TQ2 correspond to the determined torque split. The operation of the torque split module 23 will now be described in more detail with reference to a flow diagram 100 shown in FIG. 3.

The torque split module 23 receives the total requested torque TQ (block 101). A loop procedure is initiated (block 102) to determine the optimum torque split between the first and second propulsion units 5, 6 to meet the total requested torque TQ. The TPC is calculated for a plurality of different torque splits.

The TPC is calculated (block 103) for a prescribed torque split in each cycle of the loop procedure. The torque split in each cycle is determined in dependence on the loop counter variable LOOP1. In the next cycle of the loop procedure, the loop counter variable LOOP1 is incremented to change the prescribed torque split between the first and second propulsion units 5, 6. The calculated TPC is stored in respect of each cycle of the loop procedure (block 104). The loop procedure is repeated until the TPC is determined for a plurality of different front and rear torques. The front torque request TQ1 and the rear torque request TQ2 are set based on the torque split which resulted in the minimum TPC calculation (block 108). The front and rear torque demand signals DS1, DS2 are generated and output to the traction availability module 51. The torque split module 23 described herein iteratively determines the TPC across a range of torques and facilitates selection of the torque split corresponding to the minimum TPC. By selecting the minimum TPC, the first and second propulsion units 5, 6 may operate more efficiently than prior art arrangements to reduce the total power consumption.

Figure 6:
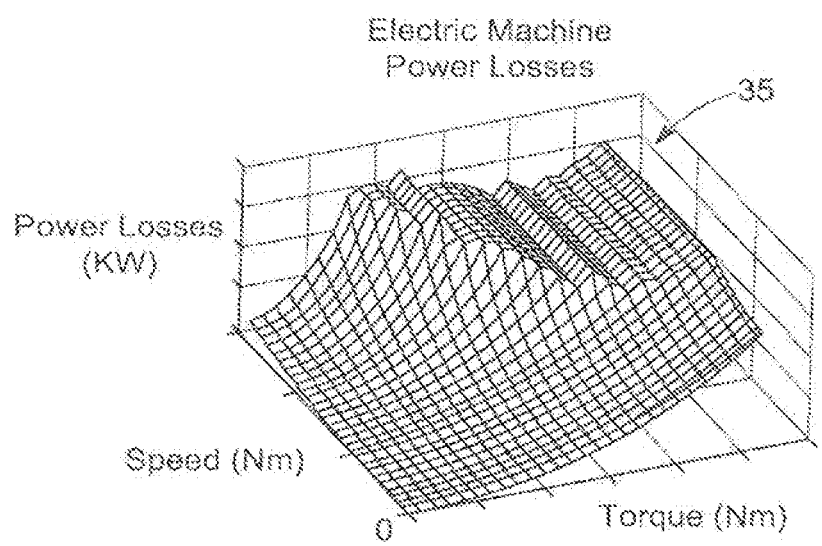
FIG. 6 shows a chart representing a penalty table for calculating a penalty power loss based on an operating temperature of the first electric machine.

The calculation of the TPC will now be described with reference to a block diagram 30 shown in FIG. 4. The TPC calculation references a first motor map 31, a second motor map 32, a first penalty table 33 and a second penalty table 34. The first motor map 31 defines a first power loss PL1 for the first electric machine 7 in dependence on the temporary front torque request TQ1_TEMP, the temperature of the first electric machine 7 (determined by the first temperature signal TS1) and the operating speed SPEED1 of the first electric machine 7 (determined by the first motor speed signal MS1). The second motor map 32 defines a second power loss PL2 for the second electric machine 10 in dependence on the temporary rear torque request TQ2_TEMP, the temperature of the second electric machine 10 (determined by the second temperature signal TS2) and the operating speed SPEED2 of the second electric machine 10 (determined by the second motor speed signal MS2). The first and second motor map 31, 32 are predefined and stored in the memory device 14. A chart 35 which is representative of the first and second motor maps 31, 32 is shown in FIG. 6. The chart 35 shows the power losses of the electric machines 7, 10 with reference to operating speed and torque.

The first and second motor maps 31, 32 may be represented in three-dimensional look-up tables, for example arranged to represent the power loss PL1, PL2, the operating speed SPEED1, SPEED2 and the temperature TEMP1, TEMP2 along respective axis.

Figure 5A:
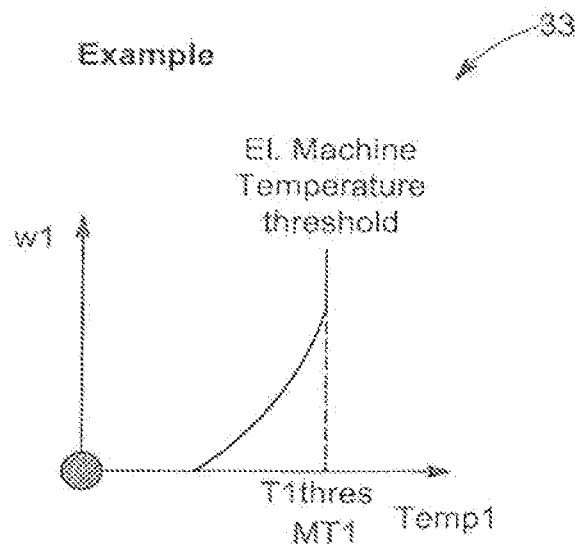
FIG. 5*a* shows a chart representing a motor map illustrating the power losses of the first electric machine with reference to operating speed and torque.
Figure 5B:
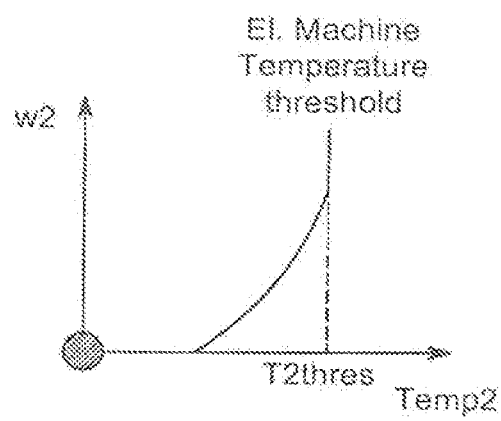
FIG. 5*b* shows a chart representing a motor map illustrating the power losses of the second electric machine with reference to operating speed and torque.

The TPC comprises the aggregate of the first and second power losses PL1, PL2. In the present embodiment, the TPC also comprises first and second power penalties PP1, PP2 calculated in respect of each of the first and second propulsion units 5, 6. The first and second power penalties PP1, PP2 are applied to provide a bias against activating either of the first and second electric machines 7, 10 if the operating temperature of that electric machine 7, 10 approaches a predetermined machine temperature threshold MT1, as illustrated in the first penalty table 33 shown in FIG. 5a. The predetermined machine temperature threshold MT1 may, for example, correspond to a temperature above which the electric machine should be de-rated to avoid damage. A first mechanical power factor MP1 is calculated by multiplying the temporary front torque request TQ1_TEMP and the operating speed SPEED1 of the first electric machine 7. A first penalty factor W1 is derived from the first penalty table 33 in dependence on an operating temperature of the first electric machine 7. The first mechanical power factor MP1 and the first penalty factor W1 are multiplied together to determine the first power penalties PP1. A second mechanical power factor MP2 is calculated by multiplying the temporary rear torque request TQ2_TEMP and the operating speed SPEED2 of the second electric machine 10. A second penalty factor W2 is derived from the second penalty table 34 shown in FIG. 5b in dependence on an operating temperature of the second electric machine 10. The second mechanical power factor MP2 and the second penalty factor W2 are multiplied together to determine the second power penalty PP2. The first and second power losses PL1, PL2 and the first and second power penalties PP1, PP2 are aggregated to calculate the TPC for a given front and rear torque split. It will be understood that the first and second power penalties PP1, PP2 may be integrated into the first motor map 31 and/or the second motor map 32. For example, the first and second motor maps 31, 32 may be modified to include a penalty associated with the temperature of the respective first and second electric machines 7, 10 to bias the torque split away from one or other of said first and second electric machines 7, 10 as the operating temperature approaches the electric machine temperature threshold T1.

In a variant of the TPC calculation described herein, first and second motor maps may be identified for respective operating temperatures of the first and second electric machines 7, 10. The first and second motor maps may represent the power loss of each of the first and second electric machines 7, 10 based on their current operating temperatures. The first and second motor maps may be aggregated and the minimum power loss identified. The complementary temporary front and rear torque requests TQ1_TEMP, TQ2_TEMP corresponding to the minimum power loss may then be used to set the operating torque of the first and second electric machines 7, 10.

Power losses could include losses from other subsystems including mechanical drive units (differentials and gearboxes), inverters and related cooling systems. The need to cool a system could be taken into account for example, when ascertaining overall power cost in the system to operate an electric machine at a particular torque level and temperature.

It will be understood that the techniques described herein may be used to control the first and second electric machines 7, 10 when they are energized to generate a traction torque and/or a regenerative torque.

The first and second electric machines 7, 10 described herein may have the same ratings and operating characteristics. In this arrangement, the same motor maps 31, 32 and penalty tables 33, 34 may be used in the TPC calculation in respect of the first and second electric machines 7, 10. Since the temperature of the first and second electric machines 7, 10 may be different from each other, it will be understood that the calculations may be different for each of the first and second electric machines 7, 10. It will be understood that the first electric machine 7 may have different ratings and/or operating characteristics than those of the second electric machine 10. In this arrangement, different motor maps 31, 32 and/or penalty tables 33, 34 may be used in the TPC calculation in respect of the first and second electric machines 7, 10.

The invention has been described with reference to an embodiment in which the first and second electric machines 7, 10 are associated with front and rear axles 3, 4 of the vehicle 1.

In a variant, the first and second electric machines 7, 10 may be associated with the same axle 3 or 4. For example, the first and second electric machines 7, 10 may be arranged to transmit torque to opposing wheels W1-2 or W3-4 provided on the same axle 3 or 4. The techniques described herein are equally applicable to this scenario.

The present invention has been described with reference to a vehicle 1 having first and second electric machines 7, 10. It will be understood that the vehicle 1 may comprise more than two (2) electric machines 7, 10. For example, the vehicle 1 may comprise three (3) electric machines or four (4) electric machines arranged to transmit torque to the front and rear axles 3, 4. The techniques described herein may be employed in these configurations.

It will be appreciated that various modifications may be made to the embodiment(s) described herein without departing from the scope of the appended claims.

For purposes of this disclosure, it is to be understood that the controller(s) described herein can each comprise a control unit or computational device having one or more electronic processors. A vehicle and/or a system thereof may comprise a single control unit or electronic controller or alternatively different functions of the controller(s) may be embodied in, or hosted in, different control units or controllers. A set of instructions could be provided which, when executed, cause said controller(s) or control unit(s) to implement the control techniques described herein (including the described method(s)). The set of instructions may be embedded in one or more electronic processors, or alternatively, the set of instructions could be provided as software to be executed by one or more electronic processor(s). For example, a first controller may be implemented in software run on one or more electronic processors, and one or more other controllers may also be implemented in software run on or more electronic processors, optionally the same one or more processors as the first controller. It will be appreciated, however, that other arrangements are also useful, and therefore, the present disclosure is not intended to be limited to any particular arrangement. In any event, the set of instructions described above may be embedded in a computer-readable storage medium (e.g., a non-transitory computer-readable storage medium) that may comprise any mechanism for storing information in a form readable by a machine or electronic processors/computational device, including, without limitation: a magnetic storage medium (e.g., floppy diskette); optical storage medium (e.g., CD-ROM); magneto optical storage medium; read only memory (ROM); random access memory (RAM); erasable programmable memory (e.g., EPROM ad EEPROM); flash memory; or electrical or other types of medium for storing such information/instructions.

As used herein 'module' refers to a unit or apparatus that excludes certain parts/components that would be added by an end manufacturer or a user.

Figure 3:
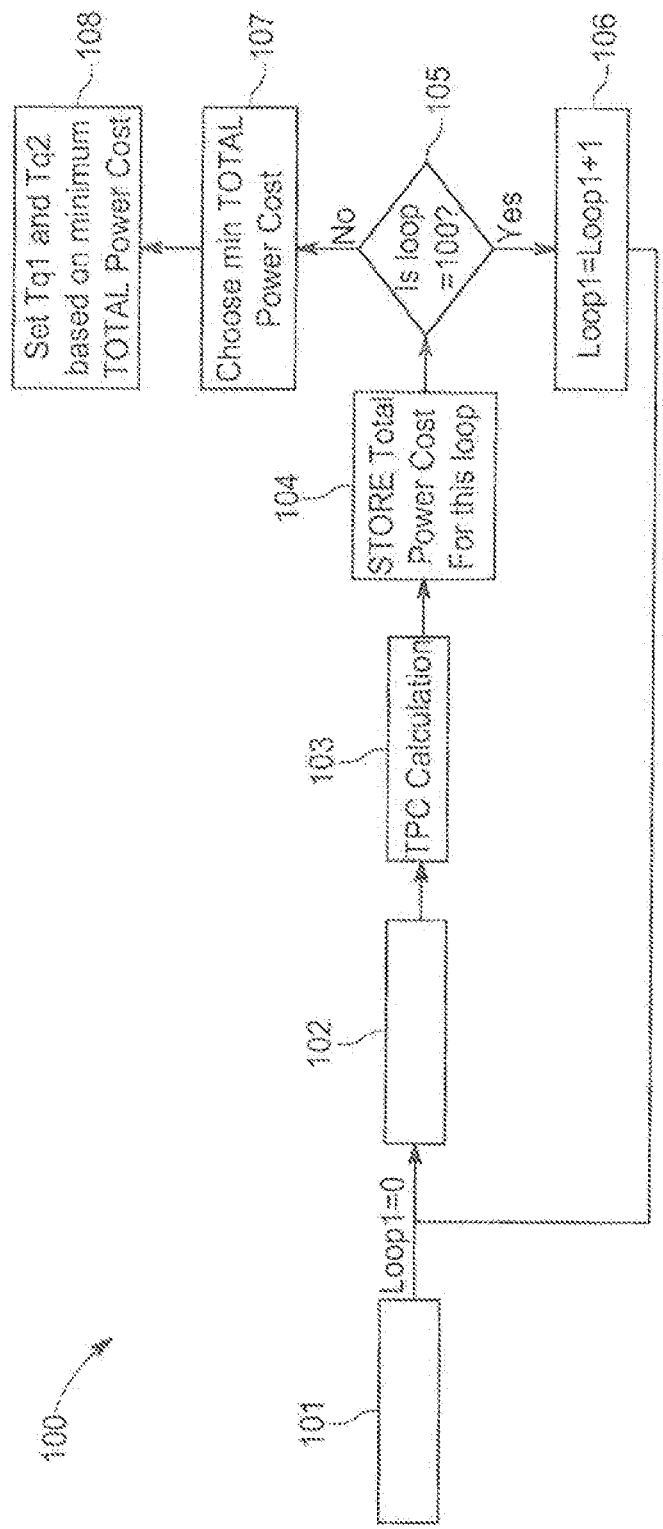
FIG. 3 shows a flow diagram illustrating the operation of a torque split module to determine a front and rear torque split through iterative analysis.
Figure 4:
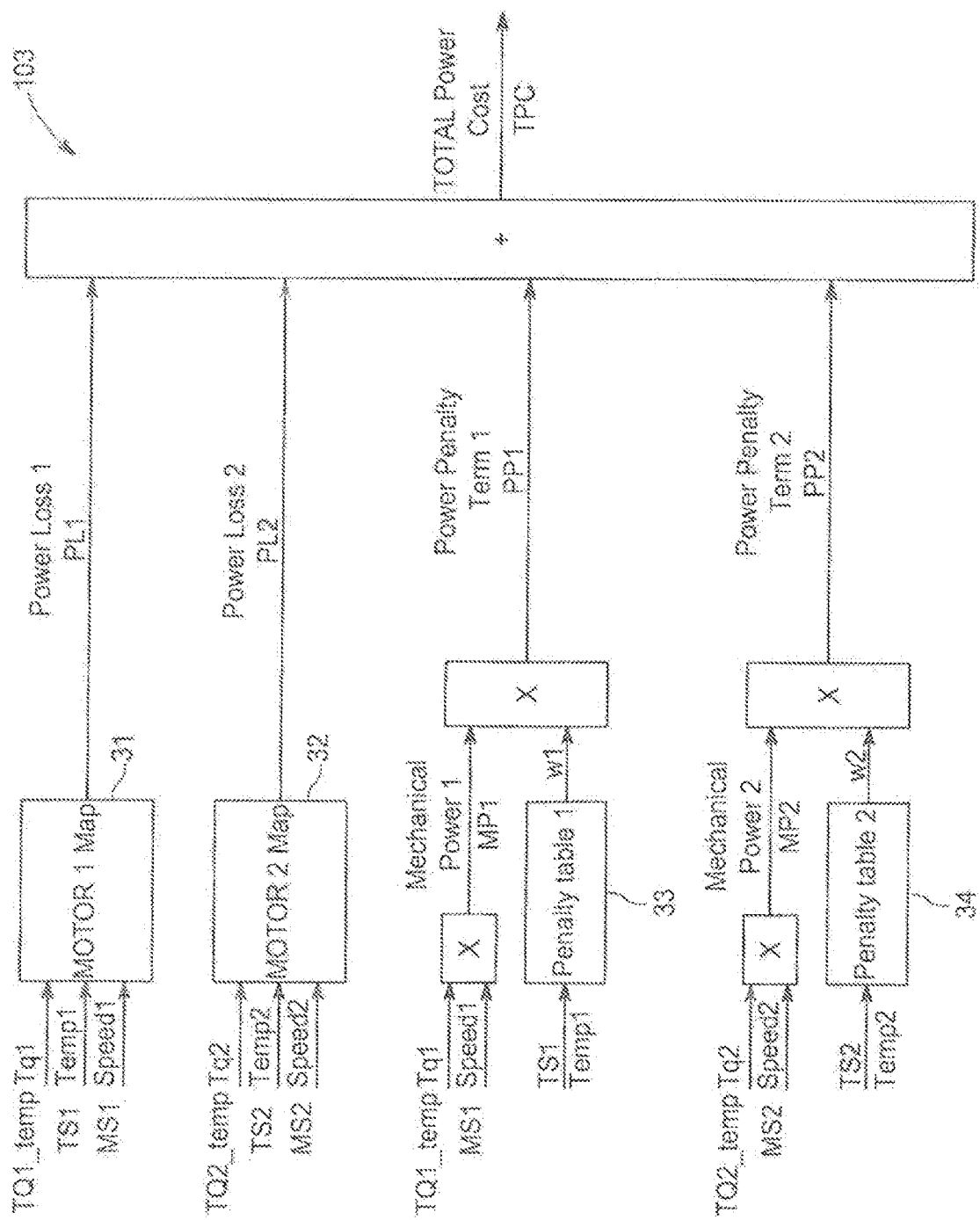
FIG. 4 shows a schematic representation of the operation of the torque split module shown in FIG. 3 to calculate a total power cost associated with a particular front and rear torque split.

The blocks illustrated in FIGS. 3 and 4 may represent steps in a method and/or sections of code in a computer program. The illustration of a particular order to the blocks does not necessarily imply that there is a required or preferred order for the blocks and the order and arrangement of the block may be varied. Furthermore, it may be possible for some steps to be omitted.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A controller for a vehicle with a front and rear axle, each axle being provided with at least two wheels and at least first and second propulsion units, wherein the controller is configured to control the at least first and second propulsion units to generate a combined torque with reference to a total requested torque, the controller comprising:
   a traction availability module configured to receive one or more traction signals indicating available traction at at least one wheel;
   a traction determination module configured to determine a traction torque range defined by a maximum and minimum torque for at least one of the at least first or second propulsion units in dependence on one or more of the one or more traction signals;
   a torque split module configured to determine a proposed distribution of torque between each of the at least first and second propulsion units with reference to the total requested torque, and to determine a proposed torque to be generated by each of the at least first and second propulsion units in dependence on the proposed distribution of torque;
   a torque shaping module configured to compare the traction torque range determined for each propulsion unit for which the traction torque range has been determined and the proposed torque for that propulsion unit, and to generate at least one torque control signal for controlling at least one of the at least first and second propulsion units, wherein the at least one torque control signal is a signal to the at least first or second propulsion units to generate the proposed torque for that propulsion unit if the proposed torque for that propulsion unit is within the traction torque range for that propulsion unit, wherein the controller is further configured to determine at least first and second power loss penalties in dependence on current operating parameters of the at least first and second propulsion units, and wherein the at least first and second propulsion units each comprise an electric machine, wherein the controller is further configured to determine the at least first and second power loss penalties in dependence on an operating temperature of the associated electric machine.

2. The controller according to claim 1, wherein the first and second power loss penalties are applied to provide a bias against activating either of the first and second electric machines if the operating temperature of that electric machine approaches a predetermined machine temperature threshold.

3. The controller according to claim 1, wherein the torque split module is configured to:
determine a total power cost in dependence on an estimated power loss of the at least first and second propulsion units within said at least first and second torque ranges,
identify a minimum value of the determined total power cost, and
determine the torque to be generated by each of said at least first and second propulsion units, comprising determining a torque that corresponds to the identified minimum value of the total power cost.

4. The controller according to claim 3, wherein the total power cost is determined in dependence on the estimated power loss and the power loss penalties of each of said at least first and second propulsion units.

5. The controller according to claim 3, wherein the power loss of each of the at least first and second propulsion units is estimated in dependence on one or more of the following set: an operating temperature, an operating speed, and a motor torque.

6. The controller according to claim 3, wherein the controller is further configured to estimate the power loss of each of the at least first and second propulsion units at a plurality of intervals within the determined first and second torque ranges.

7. The controller according to claim 1, wherein the proposed distribution of torque between each of the at least first and second propulsion units with reference to the total requested torque is based at least in part on an efficiency of operation of each of the at least first and second propulsion units.

8. The controller according to claim 1, comprising a module configured to receive at least one NVH signal relating to one or more of noise vibration and or harshness characteristics of the vehicle, wherein the traction torque range for at least one of the at least first or second propulsion units is determined in dependence on at least one of the one or more traction signals and at least one of the at least one NVH signal.

9. The controller according to claim 8, wherein the controller further comprises:
a module configured to receive at least one vehicle dynamics signal relating to one or more of a handling of the vehicle, a steering feel of the vehicle and or an environment around the vehicle; and wherein the traction torque range for at least one of the at least first or second propulsion units is determined in dependence on at least one of the one or more traction signal and at least one of the at least one vehicle dynamics signal.

10. The controller according to claim 9, wherein the at least one of the one or more traction signals has greater influence in the determination of the traction torque range than the at least one of the at least one vehicle dynamics signal.

11. The controller according to claim 9, wherein the at least one of the one or more traction signals has greater influence in the determination of the traction torque range than the at least one of the at least one vehicle dynamics signal when present, the at least one of the one or more traction signals has greater influence in the determination of the traction torque range than the at least one of the NVH signals, and the at least one of the at least one vehicle dynamics signal when present has greater influence in the determination of the traction torque range than the at least one of the NVH signals.

12. The controller according to claim 1, wherein the at least one torque control signal is a signal to the at least one of the first and second propulsion units to generate a torque with a value approximately equal to whichever of maximum or minimum torques for that propulsion unit is closest to the proposed torque if the proposed torque for that propulsion unit is not within the traction torque range for that propulsion unit.

13. A system comprising the controller of claim 1 for a vehicle with a front and rear axle, each axle being provided with at least two wheels, and at least first and second propulsion units, the controller being adapted to control the at least first and second propulsion units to generate a combined torque with reference to a total requested torque.

14. A vehicle comprising the controller according to claim 1.

15. A method for controlling at least first and second propulsion units of a vehicle with a front and rear axle, each axle being provided with at least two wheels, the at least first and second control units being suitable to generate a combined torque with reference to a total requested torque, the method comprising:
receiving at least one traction signal indicating available traction at at least one wheel; determining a traction torque range defined by a maximum and minimum torque for at least one of the at least first or second propulsion units in dependence on at least one of the traction signals;
determining a proposed distribution of torque between each of the at least first and second propulsion units with reference to the total requested torque;
determining a proposed torque to be generated by each of the at least first and second propulsion units in dependence on the proposed distribution of torque;
comparing the traction torque range determined for each propulsion unit for which a traction torque range has been determined and the proposed torque for that propulsion unit;
generating at least one torque control signal for controlling at least one of the at least first and second propulsion units, wherein the at least one torque control signal is a signal to the propulsion unit to generate the proposed torque for that propulsion unit if the proposed torque for that propulsion unit is within the traction torque range for that propulsion unit;

determining at least first and second power loss penalties in dependence on current operating parameters of the at least first and second propulsion units, and wherein the at least first and second propulsion units each comprise an electric machine, determining the at least first and second power loss penalties in dependence on an operating temperature of the associated electric machine.

16. A non-transitory computer readable medium storing a computer program comprising computer program instructions, that, when performed by one or more electronic processors, causes the method according to claim 15 to be performed.

\* \* \* \* \*